Sept. 15, 1970  J. R. WILLSON  3,528,452

DIAPHRAGM OPERATED FLOW CONTROL DEVICE

Filed Sept. 27, 1967

INVENTOR
JAMES R. WILLSON

Christen Sabol O'Brien & Caldwell
ATTORNEYS

United States Patent Office 3,528,452
Patented Sept. 15, 1970

3,528,452
DIAPHRAGM OPERATED FLOW CONTROL DEVICE
James R. Willson, Fountain Valley, Calif., assignor to Robertshaw Controls Company, Richmond, Va., a corporation of Delaware
Filed Sept. 27, 1967, Ser. No. 671,035
Int. Cl. F16k 31/12; G05d 7/00
U.S. Cl. 137—495                                              6 Claims

ABSTRACT OF THE DISCLOSURE

A flow control device having a differential pressure operated diaphragm modulating a main valve to regulate the pressure of a main flow between selected limits and subjecting one side of the diaphragm to a regulated pilot flow with the other side being subjected to outlet pressure of the main flow by means of bleed passages which include a transfer control valve whereby the other side of the diaphragm is subjected to main inlet pressure to provide an additional force supplementing the normal force which closes the main valve.

BACKGROUND OF THE INVENTION

Field of the invention

The present invention relates to flow control valves operated by a differential pressure diaphragm for regulating the pressure of the fluid flow. The differential pressures on the main diaphragm are obtained by an internal bleed system which effect modulation as well as on-off control of the main flow.

Description of the prior art

Conventional devices utilize the concept of regulating the pressure of a main flow by diaphragm means operated on the bleed principle in accordance with on-off control and pressure regulation of the bleed flow line. While the prior art devices operate satisfactorily for their particular requirements, it is desirable to assure immediate and positive closure of the main flow valve by subjecting the diaphragm to increased pressure in its off position.

SUMMARY OF THE INVENTION

It is, therefore, an object of the present invention to provide an additional pressure force during closure of the main diaphragm valve by selective controls in the bleed line system.

Another object of this invention is to utilize a bleed system for subjecting a main diaphragm operated valve to inlet pressure in its closed position.

In accordance with the present invention, the diaphragm operated flow control device includes a casing having an inlet, a main outlet and a pilot outlet, a pilot flow passage extending between the inlet and the pilot outlet, a pilot regulating means operatively disposed in the pilot flow passage for pressure regulation of a pilot flow therethrough, a main valve operatively disposed between the inlet and the main outlet for controlling a main flow to the main outlet, a pressure operated diaphragm operatively connected to the main valve to move the same for control and pressure regulation of the main flow, a pair of pressure chambers in the casing with the diaphragm defining a movable wall therebetween, conduit means having one end communicating with the pilot flow passage downstream of the pilot regulating means and another end communicating with one of the pressure chambers whereby one side of the diaphragm is subject to pressure of the regulated pilot flow, a bleed passage having one end communicating with the other one of the pressure chambers, a bleed line control including a bleed chamber being in communication with the other end of the bleed passage, an inlet pressure bleed passage and an outlet pressure bleed passage communicating with the bleed chamber and being subject to a control valve therein whereby the said other of the pressure chambers is alternatively subjected to inlet pressure and main outlet pressure.

Other objects and advantages of the present invention will become apparent from the following description, taken in conjunction with the accompanying drawing.

DESCRIPTION OF THE PREFERRED EMBODIMENT

Figure 1:
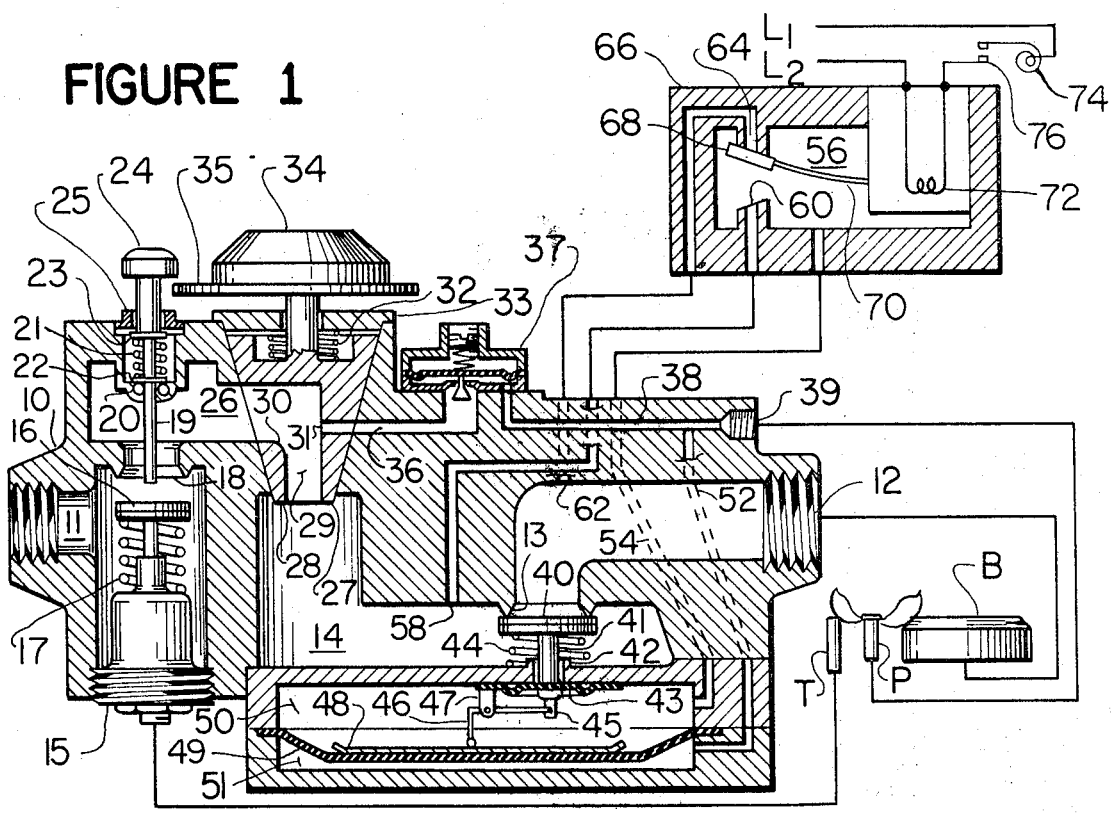
FIG. 1 is a diagrammatic cross section of a flow control system embodying this invention with the main diaphragm operated valve in a closed position.

The present invention is embodied in a flow control system as shown in FIG. 1 for controlling the flow of fuel to burner apparatus including a main burner B, a pilot burner P and a thermocouple T disposed in the flame of the pilot burner P which is located in igniting proximity to the main burner B. A combination control device, indicated generally at 10, has an inlet 11 connected to a source of fuel, such as a gas main (not shown), an outlet 12 connected by suitable piping to the main burner B, and an annular valve seat 13 between the outlet 12 and an inlet chamber 14 which receives a main flow of fuel from the inlet 11. As is illustrated in FIG. 1, adjacent the inlet 11, the main flow is controlled by a resettable automatic safety device, indicated generally at 15, which is conventional practice in the art.

The automatic safety device 15 includes a safety valve member 16 biased by a coil spring 17 towards a valve seat 18; the valve member 16 is held away from the seat 18 by an electromagnetic mechanism which is electrically connected to the thermocouple T (FIG. 1). The voltage generated by the thermocouple T is not sufficient to attract the armature to the magnet core of the electromagnetic mechanism but is sufficient to hold such armature in its attracted position. Accordingly, reset means to move the armature to its attracted position include a plunger 19 having one end extending through the valve seat 18 and its opposite end slidably extending through a wall of casing 10 that is sealed by an O-ring 20. A coil spring 21 surrounds a portion of the plunger 19 and is mounted in compression between a washer 22 freely mounted thereon and an annular collar 23 fixed to the plunger 19 for movement therewith. A push button 24 is fixed on the protruding end of plunger 19 and extends through a guide collar 25 into engagement with plunger collar 23.

The valve seat 18 establishes communication between the inlet 11 and a hollow portion 26 of the casing 10, which is intersected by a conical bore 27 having a truncated end communicating with the inlet chamber 11. A manually operable plug valve 28 similarly shaped as a truncated core is rotatably seated in the conical bore 27. The plug valve 28 has a central axial bore 29, one end of which opens into the inlet chamber 14 and the other end of which opens into a radial port 30 for registry with the hollow portion 26. Circumferentially spaced from the radial port 30, the plug valve 28 has a second smaller port 31 radially extending from the bore 29 to establish a pilot flow of fuel. A coil spring 32 surrounds a stem on the large end of the plug valve 28 and is mounted in compression between such large end and a cover plate 33 secured to the top of casing 10 by any suitable fastening means (not shown). A dial knob 34 is keyed to the protruding end of the plug valve stem for manually rotating the plug valve 28 between "off," "pilot" and "on" positions. The dial knob 34 has a peripheral flange 35 which extends under the reset button 24; a notched portion in the flange 35 aligns with the reset button 24 only when the knob 34 is in the "pilot" position whereby the reset button may only be depressed when the plug valve 28 is in the "pilot" position.

Downstream of the plug valve 28, a pilot flow passage 36 is controlled by a pressure regulator 37 of conventional structure which regulates the pressure of the pilot flow of fuel to the pilot outlet passage 38 leading to the pilot outlet 39 that is connected by suitable piping to the pilot burner P.

The main flow of fuel from the inlet chamber 14 is controlled by a main valve member 40 movable relative to the main valve seat 13 by a valve stem 41 which extends through a guide collar 42 and which is secured intermediate its ends to a sealing and balancing diaphragm 43. The diaphragm 43 provides a balancing force to counterbalance the pressure differential across the valve seat 13 whereby the regulation characteristics are greatly improved, particularly at low flows. A coil spring 44 surrounds the stem 41 and is mounted in compression between the undersurface of the annular valve member 40 and an internal wall. A pivot pin 45 connects the lower end of stem 41 to the end of an L-shaped crank arm 46 having its longer leg pivotally mounted intermediate its ends to a pivot pin 47 that is carried by an adjacent wall of the casing 10. The shorter leg of crank arm 46 is pivotally connected to the center of a back-up plate 48 which is centrally fixed to a flexible diaphragm 49 made of rubber or the like. The periphery of diaphragm 49 is sealingly mounted between adjacent sections of the casing 10 while its central portion separates the hollow portions of such sections into upper and lower pressure chambers 50 and 51, respectively. With the above arrangement, the valve member 40 is provided with a modulated movement to regulate the pressure of the fluid flow past the valve seat 13 in accordance with differential pressure variations as sensed by the pressure chambers 50 and 51.

The casing 10 is provided with internal porting communicating with the pressure chambers 50 and 51 to provide the operating pressures therefor. Accordingly, a bleed passage 52 has one end communicating with an intermediate portion of the pilot outlet passage 38 and an opposite end communicating with the bottom pressure chamber 51. A second bleed passage 54 has one end communicating with the top pressure chamber 50 and its opposite end opening into a bleed line chamber 56. An inlet pressure bleed passage 58 has one end communicating with the inlet chamber 14 and an opposite end terminating in a port 60 opening into the bleed line chamber 56; similarly, an outlet pressure bleed passage 62 has one end communicating with the outlet 12 and an opposite end terminating in a port 64 opening into the bleed line chamber 56 in oppositely disposed relation to the port 60.

The bleed line chamber 56 is enclosed in a hollow housing 66 which is schematically illustrated as being separated from the main casing of the control device, however, it is to be understood that the housing 66 may be secured to the top of the main casing 10 or may be integrally formed therewith. A bleed control valve in the form of a valve plate 68 is pivotally mounted in the chamber 56 for movement between the oppositely disposed ports 60 and 64. The valve plate 68 is moved by any suitable actuator means, such as conventional hydraulic or electrical actuators. The actuator means shown on the drawing is an electric actuator comprising an armature lever 70 fulcrummed on an electromagnetic core (not shown) which is energized by a coil winding 72. A series circuit for the coil winding 72 is traced from a power lead $L_1$ through a spiral bimetal 74, a pair of contacts 76 and the coil winding 72 to a power lead $L_2$. The spiral bimetal 74 and contacts 76 constitute a conventional space thermostat which responds to the heat of the space being heated by the main burner B; that is the contacts 76 are closed when there is a demand for heat and are opened when the demand for heat has been satisfied.

In the following description of the sequence of operation of FIG. 1, it will be assumed that the pilot flow passage 36 is in communication with the inlet 11 either or under the control of the safety device 15 and/or the manual plug valve 28; accordingly, a pilot flow of fuel from the passage 36 is subject to pressure regulation by the pilot regulator 37 so that a regulated pilot flow proceeds through the pilot outlet passage 38, the pilot outlet 39 and the piping to the pilot burner P which maintains a flame for igniting the main burner B during its cycling in response to thermostatic control. The regulated pilot flow in the pilot outlet passage 38 also proceeds through the conduit 52 to the bottom pressure chamber 51 whereby the undersurface of diaphragm 49 is subject to the pressure of the regulated pilot flow. With the manual plug valve 28 in its "on" position and the bleed valve 68 in its first position as shown in FIG. 1, a bleed line flow proceeds from the inlet chamber 14 through the inlet pressure bleed passage 58, the open port 60, the bleed chamber 56 and the bleed conduit 54 to the top pressure chamber 50 whereby the top surface of diaphragm 49 is subject to inlet pressure of the main flow. Because the inlet pressure is higher than the regulated pilot flow pressure, a pressure differential between the pressure chambers 50 and 51 displaces the diaphragm 49 downwardly; consequently, the valve arm 46 is in its counterclockwise pivoted position as shown in FIG. 1. This pressure differential adds a force to the main valve 40 and thus supplements the biasing force of coil spring 44 whereby the main valve 40 is assured of being closed whenever the demand for heat has been satisfied.

Figure 2:
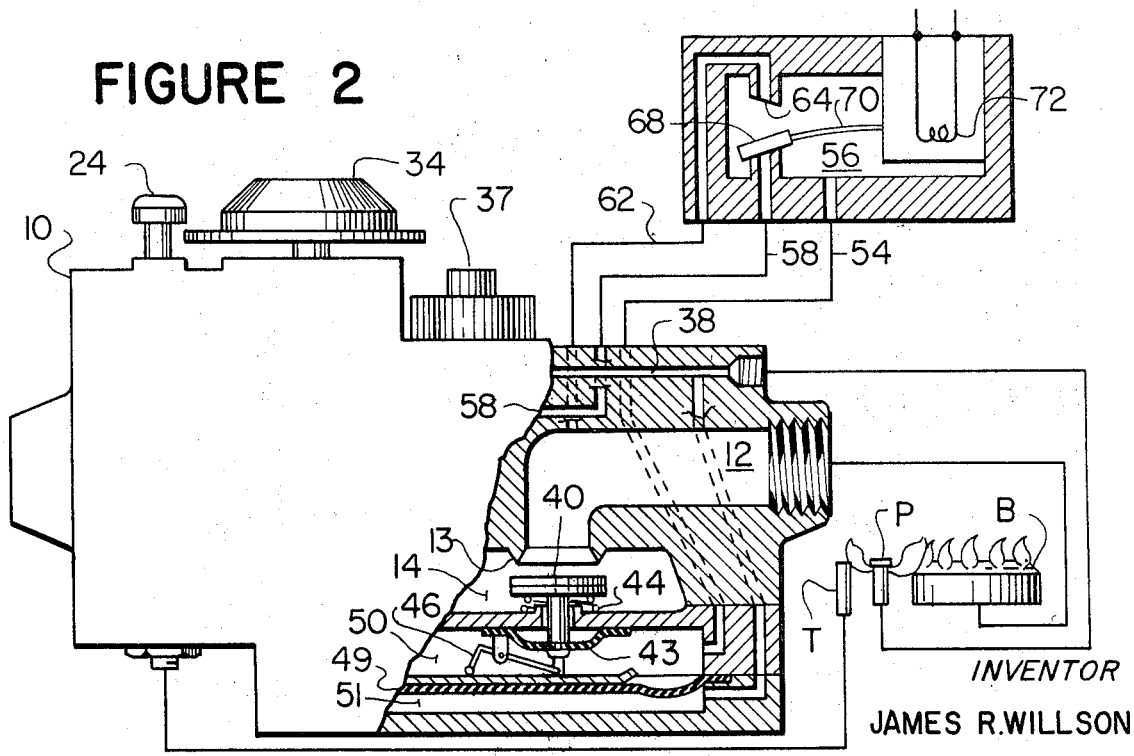
FIG. 2 is a partial diagrammatic cross section similar to FIG. 1 but with the main diaphragm operated valve in an open position.

The above arrangement has the additional advantage of easily removing this supplemental force when it is desired that the main valve 40 be opened. Upon transfer of the bleed valve from port 64 to port 60 when there is a demand for heat, the bleed chamber 56 is closed to the higher inlet pressure and opened to the lower outlet pressure whereby the pressure chamber 50 is subject to the lower outlet pressure. The operating components are now positioned as shown in FIG. 2 to supply a regulated pressure flow to the main burner B where it is ignited by the flame of the pilot burner P.

The main valve 40, which by design has a predetermined open position to deliver a pressure regulated main flow of fuel to the main outlet 12, is subject to modulation by variations from the designed pressure differential between the pressure chambers 50 and 51. For example, inlet pressure changes in the inlet chamber 14 as by surges from the pressure source and/or outlet pressure changes in the main outlet 12 as by scale clogging the ports of main burner B, results in an unbalanced condition acting to move main diaphragm 49 whereby the main valve member 40 is subject to an opening or closing movement to bring the outlet pressure at the main outlet 12 back to the designed pressure setting for the main flow of fuel to the main burner B.

In the event the flame at the pilot burner P should be extinguished from any cause, the electromagnetic device 15 would be deenergized and the safety valve 16 would be closed on the valve seat 18 to effect 100% shut-off of all fuel flow. To relight the pilot burner P, the plug valve dial 34 must first be rotated to its "pilot" position whereby the reset button 24 may be depressed to establish a flow of fuel to the pilot burner P which is ignited as by a match; as soon as the thermocouple T is heated and the electromagnetic device 15 energized, the reset button 24 may be released and the dial 34 rotated to its "on" position.

Inasmuch as the present invention is subject to many other modifications, variations and changes in detail, it is intended that all matter contained in the foregoing description or shown on the accompanying drawing shall be interpreted as illustrative and not in a limiting sense.

What is claimed is:

1. In a diaphragm operated flow control device, the combination comprising:
   a casing having inlet means, main outlet means and pilot outlet means,
   a pilot flow passage extending between said inlet means and said pilot outlet means,
   pilot regulating means operatively disposed in said pilot flow passage for pressure regulation of a pilot flow therethrough,
   main valve means operatively disposed between said inlet means and said main outlet means for controlling a main flow to said main outlet means,
   pressure operated diaphragm means operatively connected to said main valve means to move the same for on-off control and pressure regulation of the main flow,
   means defining a pair of pressure chambers in said casing,
   said diaphragm means defining a movable wall between said pair of pressure chambers,
   conduit means having one end communicating with said pilot flow passage downstream of said pilot regulating means and another end communicating with one of said pressure chambers whereby the same is always subject to pressure at said pilot output means,
   a bleed chamber being in communication with the other one of said pressure chambers whereby the same is subject to pressure of said bleed chamber,
   an inlet pressure bleed line extending between said bleed chamber and said inlet means,
   an outlet pressure bleed line extending between said bleed chamber and said main outlet means, and
   control means in said bleed chamber alternately controlling said inlet and outlet pressure bleed lines whereby the said other pressure chamber is alternately subject to pressure of said inlet means and said main outlet means.

2. The invention as recited in claim 1 wherein said control means is movable between first and second control positions, said first position closing said inlet pressure bleed line and opening said outlet pressure bleed line into said bleed chamber, and said second position closing said outlet pressure bleed line and opening said inlet pressure bleed line into said bleed chamber.

3. The invention as recited in claim 2 wherein the pressure in the said one pressure chamber is smaller than the pressure in the said other pressure chamber when said control valve means is in its second position.

4. The invention as recited in claim 2 wherein the pressure in the said one pressure chamber is larger than the pressure in the said other pressure chamber when said control valve means is in its first position.

5. The invention as recited in claim 2 wherein said main valve means includes a valve element and resilient means exerting a closing force on the valve element and wherein the closing force is supplemented by a pressure force represented by a differential pressure between said pressure chambers whenever said control means is in its second position.

6. The invention as recited in claim 2 wherein said bleed chamber includes a pair of oppositely disposed ports, one for each of said inlet and outlet pressure bleed lines and wherein said control means comprises transfer valve means movably disposed between said ports for alternate engagement therewith.

References Cited

UNITED STATES PATENTS

| | | | |
|---|---|---|---|
| 2,219,441 | 10/1940 | Carnes | 137—495 |
| 3,351,085 | 11/1967 | Allingham | 137—495 |
| 3,354,901 | 11/1967 | Dietiker et al. | 137—495 |
| 3,386,467 | 6/1968 | Katchka | 137—495 |

M. CARY NELSON, Primary Examiner

R. J. MILLER, Assistant Examiner

U.S. Cl. X.R.

137—505.37, 505.47